(12) United States Patent
Carter et al.

(10) Patent No.: US 6,265,491 B1
(45) Date of Patent: Jul. 24, 2001

(54) CURABLE THERMOSET RESIN COMPOSITION

(75) Inventors: Jeffrey T. Carter, Middlesbrough; Patrick Terence McGrail, Cleveland, both of (GB)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 09/202,280

(22) PCT Filed: Jun. 13, 1997

(86) PCT No.: PCT/IB97/00701

§ 371 Date: Jun. 14, 1999

§ 102(e) Date: Jun. 14, 1999

(87) PCT Pub. No.: WO97/47689

PCT Pub. Date: Dec. 18, 1997

(30) Foreign Application Priority Data

Jun. 14, 1996 (GB) .................................................. 9612523

(51) Int. Cl.$^7$ ............................ C08L 63/00; C08L 61/34; C08L 81/06
(52) U.S. Cl. ......................... 525/150; 525/132; 525/134; 525/480; 525/504; 525/505; 525/509; 525/523; 525/534; 525/535; 525/537
(58) Field of Search .................................. 525/523, 534, 525/535, 504, 505, 480, 509, 132, 134, 150, 537

(56) References Cited

U.S. PATENT DOCUMENTS

| 3,776,978 | * | 12/1973 | Markovitz | 525/523 |
| 5,231,150 | * | 7/1993 | McGrail | 525/503 |
| 5,741,879 | * | 4/1998 | McCormick | 528/48 |

FOREIGN PATENT DOCUMENTS

| 0 161 576 | 11/1985 | (EP) . |
| 0 358 238 | 3/1990 | (EP) . |
| 51-129498 | 11/1976 | (JP) . |
| 62-153349 | 7/1987 | (JP) . |
| 1-144437 | 6/1989 | (JP) . |
| 4-351626 | 12/1992 | (JP) . |

* cited by examiner

*Primary Examiner*—Patricia A. Short
(74) *Attorney, Agent, or Firm*—Fitzpatrick, Cella, Harper & Scinto (57) ABSTRACT

A curable composition including a thermoset resin a curing agent component, an amount of a thermoplast component having reactive pendant and/or end groups, an organometallic curing catalyst component. The organometallic curing catalyst component is capable of forming cross-links with reactive pendant and/or end groups of the thermoset and thermoplast resins and comprises an organometallic complex compound of the formula $I=M(R)_n$, where M is selected from titanium, zirconium, hafnium, cerium, vanadium, niobium, R is selected from mono-, bi- and tri and/or tetra dentate organic ligands and n is four or six.

28 Claims, 2 Drawing Sheets

CURABLE THERMOSET RESIN COMPOSITION

The present invention relates to improvements relating to resin compositions, in particular relating to curable thermoset resin compositions, such as epoxy resin compositions, by the provision of a suitable curing means, to the process for the preparation of such curable resin compositions and to the cured products thereof.

Thermoset resins, or thermosets, are characterised by their temperature stability, induced in the curing stage by the onset of cross-linking. The resistance of this product to further application of heat (up to charring point) makes it eminently suitable for a wide number of applications, typically as structural plastics, laminates, surface coatings and adhesives. Additionally, the structural nature of these resins render them with excellent properties of mechanical and electrical strength and chemical resistance. The resins are additionally characterised by a low shrinkage on polymerisation.

It is common practice to incorporate a certain amount of a thermoplastic component in curable thermoset resins to induce additional properties of toughness and ductility and solvent resistance which extends the useful range of these products.

Conventional thermosets include the phenolics, aminoplastics, epoxys and some polyurethanes. Despite their wide range of usefulness, these resins are all characterised by a high processing cost, induced by the requirement for a high curing temperature in order to initiate the cross-linking stage of the curing process, commonly known as the post-curing stage. In European patent application no. EP-A-0 311 349 in the name of ICI Composites Inc are described epoxy resins requiring a curing temperature of the order of 180° C. or more, with the inclusion of a catalyst, in particular, curable resin compositions comprising a thermoset resin component, together with a thermoplastic resin component for property modification, and a poly aryl sulphone curing agent. The curable resins typically pass through a glass transition temperature at 120° C. but require elevated temperatures of 180° C. or more for post-curing, to raise the glass transition temperature (Tg). Typically curing is carried out at elevated pressure in the region of 3 to 7 bar, requiring the use of an autoclave or the like, increasing further both equipment and operation costs.

Whilst it is true that a lower than optimum temperature may be employed, this requires increase in cure time and the possibility that cross-linking may nevertheless not be absolute or that properties may be otherwise compromised, and nevertheless delivers little or no economic saving due to maintaining the selected temperature for a prolonged period. In industrial application, this is moreover significant since the productivity would be significantly reduced were it necessary to cure thermoset products for up to 18 hours, moreover taking up valuable autoclave time.

In certain applications thermoset resins are employed for the preparation of products which are to be produced in limited number as "designer" products, or intended for a small specialist market, or for the preparation of products which have a limited life cycle, not by virtue of their physical or mechanical integrity, but rather by virtue of changes in market demands and renewal of appearance or design. This is a severe limitation of the commercial potential of such products, since the high processing temperatures employed for their preparation necessitate the use of high temperature resistant moulds or tools where such products are made by means of moulding processes. It would be readily apparent that the most temperature resilient tools which are able to maintain their moulding integrity at the required temperatures in excess of 180° C., are typically constructed of metals and as such are expensive to commission and will be required to pay back over a relatively long period of time. This is particularly the case for example, for the manufacture of panels such as for use in the specialist aerospace industry or in the construction of vehicle, caravan, mobile home or motorbike body shells or the like which are typically subject to fluctuating demands of fashion induced by severe competition, and of technology demanding changes in body shell shape for improved stream-lining, road holding, compatibility with other technical components, weight reduction and the like. Application to other products, for example for use in the construction of composite furniture such as household, office or garden items is also envisaged, for the above reasons.

Accordingly, there is need for a curable thermoset resin which may be cured at a temperature which is less than that corresponding to the maximum temperature resistance of a suitable composite material which may be employed as a mould and which mould is required to serve for only a limited number of products and/or a limited lifetime. Moreover there is a need for such curable thermoset resin for the preparation of composite objects or products at low industrial processing cost. Moreover there is a need in some applications for such curable thermoset resin for the preparation of composite objects or products which are unmodified in respect of their mechanical and physical properties by virtue of the modified curable resin and accordingly are able to meet the demands to which the products will be subjected, for example for application in the manufacture of panels as hereinbefore described and in particular aerospace product, racing car, motor car and motorbike panels which must be able to perform to a high level of reliability in terms of mechanical and physical properties.

We have now surprisingly found a resin composition and a process for the preparation thereof which meet the above mentioned requirements in admirable manner, specifically by means of incorporation of a certain class of compounds within a curable thermoset resin composition, which compounds enable the curing at reduced temperature.

There is therefore provided, in its broadest aspect, according to the present invention a curable composition comprising:

(a) a thermoset resin component;

(b) a curing agent component;

(c) an amount of a thermoplast component; and (d) an organometallic curing catalyst component.

Reference herein to components a), b), c) and/or d) is to the active monomer compound, partially cured resin precursor, oligomer or the like, to the functionally protected inactive equivalent or to any form commonly employed in the art. The properties of the invention may be evident in the curable composition but are normally evident only in the cured form thereof.

It will be appreciated that Component a) may be suitably selected from the group consisting of an epoxy resin, an addition-polymerisation resin, especially a bis-maleimide resin, a formaldehyde condensate resin, especially a formaldehyde-phenol resin, a cyanate resin, an isocyanate resin and mixtures of two or more thereof, and is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof. Examples of addition-polymerisation resins are acrylics, vinyls, bis-maleimides, and unsaturated polyesters. Examples of formaldehyde condensate resins are urea, melamine and phenols.

More preferably the Component a) comprises at least one epoxy resin precursor, which is liquid at ambient temperature for example as disclosed in EP-A-0 311 349 or in PCT/GB/95/01303, selected from N,N,N'N'-tetraglycidyl diamino diphenylmethane (eg "MY 9663", "MY 720" or "MY 721" sold by Ciba-Geigy) viscosity 10–20 Pa s at 50° C.; (MY 721 is a lower viscosity version of MY720 and is designed for higher use temperatures); N,N,N',N'-tetraglycidyl-bis(4-aminophenyl)-1,4-diiso-propylbenzene (eg Epon 1071 sold by Shell Chemical Co) viscosity 18–22 Poise at 110° C.; N,N,N',N'-tetraglycidyl-bis(4-amino-3,5-dimethylphenyl)-1,4-diisopropylbenzene, (eg Epon 1072 sold by Shell Chemical Co) viscosity 30–40 Poise at 110° C.; triglycidyl ethers of p-aminophenol (eg "MY 0510" sold by Ciba-Geigy), viscosity 0.55–0.85 Pa s at 25° C.; preferably of viscosity 8–20 Pa at 25° C.; preferably this constitutes at least 25% of the epoxy components used; diglycidyl ethers of bisphenol A based materials such as 2,2-bis(4,4'-dihydroxy phenyl) propane (eg "DE R 661" sold by Dow, or "Epikote 828" sold by Shell), and Novolak resins preferably of viscosity 8–20 Pa s at 25° C.; glycidyl ethers of phenol Novolak resins (eg "DEN 431" or "DEN 438" sold by Dow), varieties in the low viscosity class of which are preferred in making compositions according to the invention; digylcidyl 1,2-phthalate, eg GLY CEL A-100; diglycidyl derivative of dihydroxy diphenyl methane (Bisphenol F) (eg "PY 306" sold by Ciba Geigy) which is in the low viscosity class. Other epoxy resin precursors include cycloaliphatics such as 3',4'-epoxycyclohexyl-3,-4-epoxycyclohexane carboxylate (eg "CY 179" sold by Ciba Geigy) and those in the "Bakelite" range of Union Carbide Corporation.

The Component a) is suitably the product of at least partly curing a resin precursor using a curing agent and optionally a catalyst.

The Component b) is suitably selected from any known curing agents, for example as disclosed in EP-A-0 311 349 or in PCT/GB95/01303, which are incorporated herein by reference, such as an amino compound having a molecular weight up to 500 per amino group, for example an aromatic amine or a guanidine derivative. Particular examples are 3,3'- and 4-,4'-diaminodiphenylsulphone, (available as "DDS" from commercial sources), methylenedianiline, bis (4-amino-3,5-dimethylphenyl)-1,4-diisopropylbenzene (available as EPON 1062 from Shell Chemical Co); bis(4-aminophenyl)-1,4-diisopropylbenzene (available as EPON 1061 from Shell Chemical Co); 4-chlorophenyl-N,N-dimethyl-urea, eg Monuron; 3,4-dichlorophenyl-N,N-dimethyl-urea, eg Diuron and dicyanodiamide (available as "Amicure CG 1200 from Pacific Anchor Chemical). Such amine curing agents are additional to the Component c) if such is an amine-ended thermoplast; thus the composition preferably contains epoxy-reactive amines of two types, one having a molecular weight up to 500 per amine group, the other having a molecular weight of at least 5000 per amine group and the total amine content being in the range 70–110% of the stoichiometric requirement of the epoxy resin precursor. Other standard epoxy curing agents such as aliphatic diamines, amides, carboxylic acid anhydrides, carboxylic acids and phenols can be used if desired.

Conventionally, and as described in EP-A-0 311 349 or in PCT/GB95/01303, a catalyst for the epoxy resin component/curing agent reaction may also be used, typically a Lewis acid or a base. According to the present invention however it is convenient to dispense with such catalyst and in place thereof to employ a component d) as hereinbefore defined.

The Component c) suitably comprises at least one thermoplastic polyaryl sulphone component, for example as defined in EP-A-0- 311 349, comprising at least one polyaryl sulphone comprising ether-linked repeating units, optionally additionally comprising thioether-linked repeating units, the units being selected from the group consisting of —(PhSO$_2$Ph)$_n$— and optionally additionally

—(Ph)$_a$— wherein Ph is phenylene, n=1 to 2 and can be fractional, a=1 to 3 and can be fractional and when a exceeds 1, said phenylenes are linked linearly through a single chemical bond or a divalent group other than —SO$_2$— or are fused together, provided that the repeating unit —(PhSO$_2$Ph)$_n$— is always present in said at least one polyarylsulphone in such a proportion that on average at least two of said units —(PhSO$_2$Ph)$_n$— are in sequence in each polymer chain present, said at least one polyarylsulphone having reactive pendant and/or end groups of formula —A'—Y where A' is a divalent hydrocarbon group and Y is a group selected from groups providing active hydrogen, epoxy, cyanate, isocyanate, vinyl, allyl, ethynyl and maleimide functionality.

Preferably the polyarylsulphone component comprises polyether sulphone, more preferably a combination of polyether sulphone and of polyether ether sulphone linked repeating units, in which the phenylene group is meta- or para- and is preferably para, and wherein the phenylenes are linked linearly through a single chemical bond or a divalent group other than sulphone, or are fused together. By "fractional" reference is made to the average value for a given polymer chain containing units having various values of n or a.

Additionally, as also discussed, in said at least one polyarylsulphone, the relative proportions of the said repeating units is such that on average at least two units (PhSO$_2$Ph)$_n$ are in immediate mutual succession in each polymer chain present and is preferably in the range 1:99 to 99:1, especially 10:90 to 90:10, respectively. Typically the ratio is in the range 25–50 (Ph)$_a$, balance (Ph SO$_2$Ph)$_n$. In preferred polyarylsulphones the units are.

1 X Ph SO$_2$ Ph X Ph SO$_2$ Ph ("PES") and

11 X (Ph)a X Ph SO$_2$ Ph ("PEES")

where X is O or S and may differ from unit to unit; the ratio of 1 to 11 (respectively) preferably between 10:90 and 80:20 especially between 10:90 and 55:45.

The preferred relative proportions of the repeating units of the polyarylsulphone may be expressed in terms of the weight percent SO$_2$ content, defined as 100 times (weight of SO$_2$)/(weight of average repeat unit). The preferred SO$_2$ content is at least 22, preferably 23 to 25%. When a=1 this corresponds to PES/PEES ratios of at least 20:80, preferably in the range 35:65 to 65:35.

The above proportions refer only to the units mentioned. In addition to such units the polyarylsulphone may contain up to 50 especially up to 25% molar of other repeating units:

the preferred SO$_2$ content ranges (if used) then apply to the whole polymer. Such units may be for example of the formula.

in which A is a direct link, oxygen, sulphur, —CO— or a divalent hydrocarbon radical. When the polyarylsulphone is the product of nucleophilic synthesis, its units may have been derived for example from one or more bisphenols and/or corresponding bisthiols or phenol-thiols selected from hydroquinone, 4,4'-dihydroxybiphenyl, resorcinol, dihydroxynaphthalene (2,6 and other isomers), 4,4'-dihydroxybenzophenone, 2,2'-di(4-hydroxyphenyl) propane and -methane.

If a bis-thiol is used, it may be formed in situ, that is, a dihalide as described for example below may be reacted with an alkali sulphide or polysulphide or thiosulphate.

Other examples of such additional units are of the formula in which Q and Q', which may be the same or different, are CO or SO2; Ar is a divalent aromatic radical; and n is 0, 1, 2, or 3, provided that n is not zero where Q is SO2. Ar is preferably at least one divalent aromatic radical selected from phenylene, biphenylene or terphenylene. Particular units have the formula.

where m is 1, 2 or 3. When the polymer is the product of nucleophilic synthesis, such units may have been derived from one or more dihalides, for example selected from 4,4'-dihalobenzophenone, 4,4' bis(4-chlorophenylsulphonyl)biphenyl, 1,4 bis(4-halobenzoyl) benzene and 4,4'-bis(4-halobenzoyl)biphenyl.

They may of course have been derived partly from the corresponding bisphenols.

The polyarylsulphone may be the product of nucleophilic synthesis from halophenols and/or halothiophenols. In any nucleophilic synthesis the halogen if chlorine or bromine may be activated by the presence of a copper catalyst. Such activation is often unnecessary if the halogen is activated by an electron withdrawing group. In any event fluoride is usually more active than chloride. Any nucleophilic synthesis of the polyarylsulphone is carried out preferably in the presence of one or more alkali metal carbonates in up to 10% molar excess over the stoichiometric and of an aromatic sulphone solvent, at a temperature in the range 150–350° C.

If desired, the polyarylsulphone may be the product of electrophilic synthesis.

As previously mentioned, said at least one polyarylsulphone contains end groups and/or pendant groups of formula —A'—Y where A' is a divalent hydrocarbon group, preferably aromatic, and Y is a group reactive with epoxide groups or with a curing agent or with like groups on other polymer molecules. Examples of Y are groups providing active hydrogen especially OH, NH$_2$, NHR or —SH, where R is a hydrocarbon group containing up to 8 carbon atoms, or providing other cross-linking reactivity especially epoxy, cyanate, isocyanate, acetylene or ethylene, as in vinyl, allyl or maleimide.

The number average molecular weight of the polyarylsulphone is suitably in the range 2000 to 60000. Preferably it is over 9000 especially over 10000 for example 11000 to 25000 and structurally as well as by chemical interaction increases toughness by comparison with that of the thermoset resin alone by providing zones of the tough thermoplast between cross-linked thermoset zones. Another useful subrange is 3000–11000, especially 3000–9000 in which it acts more as chain-extender for the thermoset resin, separating and diluting local cross-links and thus toughening the structure. Within the above definition of the polyarylsulphone those are preferably chosen which are miscible with suitable epoxy resin precursors, have high modulus and Tg and are tough.

The weight proportion of thermoplast component in the composition is typically in the range 5 to 90%, especially 20 to 50, for example 25 to 40%.

The Component d) is suitably selected from organometallic compositions or compounds which are capable of forming cross-links with reactive pendant and/or end groups, such as the epoxy or hydroxy groups of the thermoset resins and the groups A'Y of the thermoplast resins, and suitably are of reactivity adapted for the advancement of the resin composition of the invention only when subjected to the desired conditions of elevated temperature. Preferably the Component d) comprises a class of organometallic complex compounds represented by the formula I:

$$M(R)_n \qquad (I)$$

wherein M is any suitable metal able to support organic ligands, R is selected from known mono-, bi- and tridentate organic ligands and n is the coordination number of the metal, and active intermediates or combination products thereof. Suitably M is selected from the transition elements and the lanthanides, preferably from titanium, zirconium, hafnium, cerium, vanadium, niobium, more preferably from titanium and zirconium, whereby n is four or six.

Suitably R is selected from organic ligands comprising one or more nucleophilic units or moieties, for example selected from straight or branched, short or long chain alcohols, amines, acids, esters, phosphates, ketones, anhydrides or the like which may optionally be additionally functionalised, and combinations thereof in the form or mono, bi, tri and/or tetradentate ligands, suitably of a combination of monodentate ligands with one or more bi, tri or tetradentate ligands, which multidentate or chelate ligands for example are suitably selected from glycols, alkanolamines, alpha-hydroxy acids, β-keto-esters and acid phosphates and combinations thereof. In a preferred embodiment the Component d) comprises an organo titanate wherein two of the organic ligands comprise monodentate ligands such as alcohols and a further two comprise bidentate chelate ligands as hereinbefore defined, however the ligands may be present in any combination of multiplicity and type.

The component d) may comprise at least in part, an amount of compound of formula I as hereinbefore defined which has been pre-reacted to form multinuclear complex, oligomeric or combination products.

Organo titanates are known, and commercially available for example from Tioxides Specialities Limited, and are used in a number of applications in the manufacture and modification of synthetic and natural products. The wide range of application of such compounds is however coupled with a wide range of effects, whereby it is not possible to predict the nature or effect thereof on specific systems without resorting to detailed experimentation. According to the present invention it has surprisingly been found that the incorporation of component d) in suitable manner, and in particular comprising an organotitanate as hereinbefore defined may enable the curing of the hereinbefore defined thermoset resin composition at significantly lowered temperature, and advantageously in a preferred aspect with no deleterious effect on the mechanical and physical properties thereof. In a particularly preferred aspect of the invention certain organotitanates enable the preparation of a thermoset resin as hereinbefore defined having morphologies superior to the corresponding resin which is prepared in absence of the organotitanate.

In a particularly advantageous aspect of the present invention the organometallic component d) may be selected for its specific application, either by virtue of the nature of Components a), b) and c) as hereinbefore defined or by virtue of the required processing temperature, processing time, mechanical or physical properties or the like which are desired.

Preferably therefore there is provided according to the present invention a thermoset resin composition as hereinbefore defined comprising the components a), b) and c) as hereinbefore defined and a component d) wherein component d) comprises one or more organotitanates represented by the formula II:

$$Ti(R')_4 \qquad (II)$$

wherein R' is selected from organic ligands as hereinbefore defined with reference to R, and suitably is selected from ligands comprising primary, secondary and tertiary $C_2$–$C_{18}$ moieties, for example comprising n- or i-propyl, n-, i- or t- butyl, pentyl, hexyl, heptyl or octyl moieties, and active intermediates or combination products thereof.

In a particularly preferred aspect of the invention, the compound of formula II as hereinbefore defined comprises one or more monodentate ligands selected from alcohols and amines as hereinbefore defined optionally in combination with one or more bidentate ligands selected from glycols, alcohol amines, alphahydroxy acids, β-ketone esters and acid phosphates as hereinbefore defined. Preferably any ligand comprises a suitable carbon chain link of the order $C_2$–$C_{18}$ as hereinbefore defined which is compatible with the other components of the composition and the desired rigidity of cross-linking.

Preferably the component d) is present, calculated as the active resin without any added solvent or the like, in an amount of up to 15 parts by weight, preferably in excess of 0.5 parts by weight, for example in the range of 1 to 12 parts by weight, and most preferably in the range of 3 to 10 parts by weight with respect to the total weight of the components a) to c). The amount of component d) will be determined by the nature of the components a), b) and c) with which it may cross-link and by the particular component d), for example an organo titanate being employed.

In a particularly advantageous aspect of the invention thermoset resins comprising an amount of thermoplast component as taught in EP-A-0 311 349 having excellent morphological properties, typically comprising a fine co-continuous morphology, are also obtained with the use of certain components d) as hereinbefore defined.

Moreover other properties such as the glass transition temperature, and mechanical properties of yield stress, modulus, ductility and the like may be advantageously enhanced according to the present invention. In particular it has been found that the composition comprising component d) as hereinbefore defined wherein at least one and preferably two of the groups R comprise a strongly nucleophilic chelate ligand, and most specifically comprise two or more ligands selected from chelates alcohol amine, β-keto-acids, -esters and -ketones and the like, provide cured products having excellent mechanical and physical properties.

The components a) to d) as hereinbefore defined are commercially available, or the preparation of components a) to c) is taught in hereinbefore mentioned EP-A-0 311 349 and or in PCT/GB95/01303.

The component d) as hereinbefore defined is suitably obtained for example from the commercially available tetrachloro compound, by means of the substitution reaction with an alcohol and substituting further as appropriate. In fact the compounds n-propyl, isopropyl and n-butyl titanate are industrially manufactured, whereby the preparation of the desired component d) is suitably performed by means of the following reaction:

$$Ti(O\text{—}iC_3H_7)_4 + 4ROH \rightarrow Ti(OR)_4 + 4iC_3H_7OH$$

wherein R is as hereinbefore defined with reference to component d).

In a further aspect of the invention there is provided a composition for use in the curing of thermoset resins as hereinbefore defined with reference to components a), b) and c) comprising an organometallic compound as hereinbefore defined with reference to component d).

In a further aspect of the invention there is provided the use of compound of formula I as hereinbefore defined, in the preparation of a component d) as hereinbefore defined for the curing of thermoplast-modified thermoset resins as hereinbefore defined.

In a further aspect there is provided according to the invention the use of a precursor or intermediate in the preparation of a compound of the formula I as hereinbefore defined for the preparation of a compound d) as hereinbefore defined for the curing of thermoplast-modified thermoset resins compositions as hereinbefore defined.

The composition is particularly suitable for fabrication of structures, including load-bearing or impact resisting structures. For this purpose it may contain a reinforcing agent such as fibres. Fibres can be added short or chopped typically of mean fibre length not more than 2 cm, for example about 6 mm. Alternatively, and preferably, the fibres are continuous and may, for example, be unidirectionally-disposed fibres or a woven fabric, ie the composite material comprises a prepreg. Combinations of both short and/or chopped fibres and continuous fibres may be utilised. The fibres may be sized or unsized. Fibres can be added typically at a concentration of 5 to 35, preferably at least 20%, by weight. For structural applications, it is preferred to use continuous fibre for example glass or carbon, especially at 30 to 70, more especially 50 to 70% by volume.

The fibre can be organic, especially of stiff polymers such as poly paraphenylene terephthalamide, or inorganic. Among inorganic fibres glass fibres such as "E" or "S" can be used, or alumina, zirconia, silicon carbide, other compound ceramics or metals. A very suitable reinforcing fibre is carbon, especially as graphite. Graphite fibres which have been found to be especially useful in the invention are those supplied by Amoco under the trade designations T650-35, T650-42 and T300; those supplied by Toray under the trade designation T800-HB; and those supplied by Hercules under the trade designations AS4, AU4, IM 8 and IM 7.

Organic or carbon fibre is preferably unsized or is sized with a material that is compatible with the composition according to the invention, in the sense of being soluble in the liquid precursor composition without adverse reaction or of bonding both to the fibre and to the thermoset/thermoplastic composition according to the invention. In particular carbon or graphite fibres that are unsized or are sized with epoxy resin precursor or thermoplast such as polyarylsulphone are preferred. Inorganic fibre preferably is sized with a material that bonds both to the fibre and to the polymer composition; examples are the organo-silane coupling agents applied to glass fibre.

The composition may contain for example conventional toughening agents such as liquid rubbers having reactive groups, aggregates such as glass beads, rubber particles and rubber-coated glass beads, filler such as polytetrafluorethylene, silica, graphite, boron nitride, mica, talc and vermiculite, pigments, nucleating agents, and stabilisers such as phosphates. The total of such materials and any fibrous reinforcing agent in the composition should be at least 20% by volume, as a percentage of the total volume of the polysulphone/thermoset mixture. The percentages of fibres and such other materials are calculated on the total composition after curing at the hereinbelow defined temperatures.

The first composition precursor is made by mixing the polysulphone, thermoset precursor and (at some stage) any fibrous reinforcing agent and other materials. A solvent may be present. The solvent and the proportion thereof are chosen so that the mixture of polymer and resin precursor form at least a stable emulsion, preferably a stable apparently single-phase solution. The ratio of solvent to polysulphone is suitably in the range 5:1 to 20:1 by weight. Preferably a mixture of solvents is used, for example of a halogenated hydrocarbon and an alcohol, in a ratio suitably in the range 99:1 to 85:15. Conveniently the solvents in such a mixture should boil at under 100° C. at 1 atm pressure and should be mutually miscible in the proportions used. Alternatively the polysulphone and thermoset or precursor can be brought together by hot melting and/or high shear mixing.

The mixture is stirred until sufficiently homogeneous. Thereafter any solvent is removed by evaporation to give a concentrated first composition precursor. Evaporation is suitably at 50–200° C. and, at least in its final stages, can be at subatmospheric pressure, for example in the range 13.33 Pa to 1333 Pa (0.1 to 10 mm Hg). The concentrated first composition precursor preferably contains up to 5% w/w of volatile solvent, to assist flow when used to impregnate fibres. This residual solvent will be removed in contact with the hot rollers of the impregnating machine.

The stable emulsion may be stored as appropriate. For further processing thereof, the emulsion must be destabilised to a desired extent, typically by addition of the curing agent in suitable nature and amount, and/or changing temperature and adding or removing solvent. The curing catalyst component d) is then added. The solution is stirred to ensure uniform distribution of both components and may be cooled and stored as a stable emulsion.

It is an advantage of the present invention that the component d) is typically in the liquid form at or close to room temperature.

The composition of the invention may be cured in known manner. Suitably the composition in form of a resin solution is transferred onto a suitable mould or tool for preparation of a panel, prepreg or the like, the mould or tool having been preheated to a desired degassing temperature.

The stable emulsion is combined with any reinforcing, toughening, filling, nucleating materials or agents or the like, and the temperature is raised to initiate curing thereof. Suitably curing is carried out at elevated temperature up to 150° C., preferably in the range of 100 to 130° C., more preferably at about 120–125° C., and with use of elevated pressure to restrain deforming effects of escaping gases, or to restrain void formation, suitably at pressure of up to 10 bar, preferably in the range of 3 to 7 bar abs. Suitably the cure temperature is attained by heating at up to 5° C./min, for example 2° C. to 3° C./min and is maintained for the required period of up to 9 hours, preferably up to 6 hours, for example 3 to 4 hours. Pressure is released throughout and temperature reduced by cooling at up to 5° C./min, for example up to 3° C./min. Post-curing at temperatures in the range of 150° C. to 180° C. may be performed, at atmospheric pressure, employing suitable heating rates to improve the glass transition temperature of the product or otherwise.

The concentrated first composition precursor, possibly containing some volatile solvent already present or newly added, can be used for example as an adhesive or for coating surfaces or for making solid structures by casting possibly in a foamed state. Short fibre reinforcement may be incorporated with composition precursor prior to curing thereof. Preferably a fibre-reinforced composition is made by passing essentially continuous fibre into contact with such precursor composition. The resulting impregnated fibrous reinforcing agent may be used alone or together with other materials, for example a further quantity of the same or a different polymer or resin precursor or mixture, to form a shaped article. This technique is described in more detail in EP-A-56703, 102158 and 102159.

A further procedure comprises forming incompletely cured composition into film by for example compression moulding, extrusion, melt-casting or belt-casting, laminating such films to fibrous reinforcing agent in the form of for example a non-woven mat of relatively short fibres, a woven cloth or essentially continuous fibre in conditions of temperature and pressure sufficient to cause the mixture to flow and impregnate the fibres and curing the resulting laminate.

Plies of impregnated fibrous reinforcing agent, especially as made by the procedure of one or more of EP-A 56703, 102158, 102159, can be laminated together by heat and pressure, for example by autoclave, vacuum or compression moulding or by heated rollers, at a temperature above the curing temperature of the thermosetting resin or, if curing has already taken place, above the glass transition temperature of the mixture, conveniently at least 120° C. and typically up to 150° C., and at a pressure in particular in excess of 1 bar, preferably in the range of 1–10 bar.

The resulting multi-ply laminate may be anisotropic in which the fibres are continuous and unidirectional, orientated essentially parallel to one another, or quasi-isotropic in each ply of which the fibres are orientated at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, may be used. Suitable laminates contain at least 4 preferably at least 8, plies. The number of plies is dependent on the application for the laminate, for example the strength required, and laminates containing 32 or even more, for example several hundred, plies may be desirable. There may be aggregates, as mentioned above in interlaminar regions. Woven fabrics are an example of quasi-isotropic or intermediate between anisotropic and quasi-isotropic.

The stable emulsions obtained in the process may have a shelf life long enough to be handled in commerce.

Accordingly there is provided in accordance with the present invention a process for the preparation of a curable resin composition comprising combining components a) and c) in suitable manner, thereafter incorporating component b) in suitable manner, followed by incorporating component d), with use of appropriate solvents, diluents, application of heat and the like as appropriate. Optionally reinforcing or strengthening agents, fillers and the like may be incorporated in suitable manner.

It should be appreciated that the process may be performed in any desired sequence, suited to the component and the desired result. For example it may be desired to pre-react any two or more components prior to cross-linking with the remaining component(s). However optimum results are obtained by the employing the sequence as hereinbefore defined.

In a further aspect of the invention there is provided a composition comprising components b) and d) as hereinbefore defined for incorporation with a composition comprising components a) and c) as hereinbefore defined, and any additional materials or agents and initiating the curing thereof.

Suitably the process as hereinbefore defined is characterised by obtaining a curable resin composition which is adapted to be cured at a temperature below that which would be required for the corresponding composition comprising only components a), b) and c) over an equivalent period of time, preferably is adapted to be cured at a temperature of less than that at which the material constituting the mould or tool on or in which it is intended to cure the resin composition becomes heat sensitive in any way, and more preferably at a temperature of less than or equal to 150° C. at elevated pressure, most preferably at a temperature of less than or equal to 135° C. at a pressure in the range of 3 to 7 bar. Suitably the composition is adapted to be cured over a period of less than or equal 6 hours, preferably less than or equal to 4 hours, most preferably of the order of less than or equal to 3 hours.

In a further aspect of the invention there is provided a process for the preparation of a cured thermoset resin comprising obtaining the curable resin composition in a suitable mould or tool, or equivalent state in which it is to be cured subjecting the composition to a desired cure temperature at suitable pressure, for example at atmospheric pressure and maintaining the temperature for a required period. Preferably the cure temperature is selected as hereinbefore defined, with reference to the temperature sensitivity of a mould or the like which is being employed or otherwise, more preferably is less than or equal to 150° C. at elevated pressure. Preferably the curing time is determined as hereinbefore defined.

In a further aspect of the invention there is provided the use of a composite mould or tool to contain or support a composition according to the invention as hereinbefore defined during the curing thereof. Preferably such composite tool is constructed of any suitable unsaturated polyester or thermoset resin such as epoxy or bis-maleinides having a heat resistance in excess of the curing temperature to be employed. Reinforcement is suitably provided in the form of glass fibres. Composite moulds may be prepared in conventional manner for use according to the present invention.

In a further aspect of the invention there is provided a prepreg comprising a composition as hereinbefore defined and obtained by a process as hereinbefore defined.

In a further aspect of the invention there is provided a thermoplast-modified thermoset resin shaped product which is obtained by the method as hereinbefore defined. Preferably such product is selected from a car, motorbike, caravan or a mobile home panel as hereinbefore defined or from a furniture component as hereinbefore defined, which is to be made in limited number or for a limited period only. More preferably such object is a vehicle body shell, for example, a racing car body shell.

The invention is now illustrated in non limiting manner with reference to the following examples.

EXAMPLE 1

Preparation of a Neat Resin Composition of the Invention

A neat resin composition was made in the following manner wherein parts are by weight. 24.8 parts and 25.8 parts respectively of epoxy resin components MY0510 and PY306 were weighed into a 500 cm$^3$ tin and warmed to about 40° C. Upon dissolution, 30 parts of thermoplast resin component comprising polyarylsulphone of 40:60 PES:PEES ratio, RV 0.26 and —NH$_2$ ends, made according to the procedure given below, pre-dissolved in dichloromethane, was added to the two blended epoxies. The solution was then heated to facilitate the dissolution of precipitated polymer. 19.6 parts of catalyst component DDS was then added with some additional solvent to aid dispersion. The volume of solvent was reduced and 5 parts of titanate curing component (active weight) was incorporated at this stage in the preparation of the resin solution.

The polyarylsulphone used in this example was synthesised by reacting together the appropriate aromatic dihalocompounds and dihydric phenols exemplified by 4,4'-dichlorodiphenyl sulphone (DCDPS) (50 molar parts) with hydroquinone (10 to 40 molar parts) and 4,4'-dihydroxydiphenylsulphone (40–10 molar parts) in presence of potassium carbonate optionally with sodium carbonate, and diphenyl sulphone (DPS) solvent at a temperature rising to 280° C. The synthesis used excess DCDPS and the product thereof was reacted further with m-aminophenol to give amino end groups. The polyarylsulphone was characterised by a 40:60 PES : PEES ratio, an RV of 0.26 and amino end groups.

Compositions were obtained according to the procedure of Example 1 with the use of the following organotitanates as the curing component of Example 1, each in an active amount of 5 parts by weight together with additional solvent as required, as follows:

| 1a. | Tilcom TIPT | (tetraisopropyl titanate); |
|---|---|---|
| 1b. | Tilcom IOT | (iso octyl titanate); |
| 1c. | Tilcom TNBT | (Tetra-n-butyl titanate); |
| 1d. | Tilcom OGT | (Octyleneglycol titanate); |
| 1e. | Tilcom TET | (Triethanolamine titanate); |
| 1f. | Tilcom AT23 | (Alkanolamine titanate); |
| 1g. | Tilcom TAA | (Titanium acetylacetone); |
| 1h. | Tilcom IA10 | (Titanium chelate solution). |
| 1i | Tilcom P12 | (Titanium acetylacetone (non crystalline)). |

EXAMPLE 2

Preparation of a post-cured resin casting according to the invention. The neat resin solution described under Example 1 was poured into a 15 cm by 10 cm open cast metal mould, which had been previously heated to the desired degassing temperature. The resin solution was then degassed for 45 minutes under vacuum, after which the oven temperature was increased to cure temperature of 125° C. and the vacuum removed.

The curing of the resins was monitored every half hour by attempting to pierce the surface with a spatula. Curing was determined to have been completed when the surface of the resin was considered to have gelled.

The process of Example 2 was carried out with use of the compositions 1a to 1i.

Comparative Example 1

The process of Example 1 was repeated but with the omission of an organometallic Component d) as hereinbefore defined.

The thus obtained composition was used for the preparation of a comparative neat resin casting according to the process of Example 2 using the cure temperature of 125° C. The example was also repeated using a cure temperature of 180° C.

The results are given in Table 1 below illustrating the cure temperatures and cure times obtained for compositions 1a to 1i and comparative example 1.

TABLE 1

| Resin (125° C.) | Amount of Titanate used (parts wt) | Cure Time (hours) |
| --- | --- | --- |
| 1e | 6.25 | 3 |
| 1a | 5.0 | 4 |
| 1d | 5.0 | >15 |
| 1c | 5.0 | 5 |
| 1g | 6.66 | 2.5 |
| 1b | 5.0 | >15 |
| 1h | 7.6 | 4 |
| 1f | 7.24 | 6.5 |
| Comp. Ex 1 125° C. | — | >18 |
| Comp. Ex 1 180° C. | — | 3 |

In Table 1 the amount of titanate used is calculated to give an active amount of 5 parts by weight with respect to the titanium constituent.

From Table 1 is apparent that the compositions of the present invention are superior to those of the comparative example, in most cases showing a dramatic improvement in cure time which would be of enormous industrial potential.

The cured products obtained with examples 1e, 1f and 1g moreover showed finished quality which were comparable to or indistinguishable from those of the corresponding comparative example cured at elevated temperature according to known practices.

EXAMPLE 3

The process of Example 2 was repeated with use of the compositions 1e, 1f and 1g but using varied amount of the respective organometallic component d). The resulting compositions were cured at a temperature of 125° C. according to the process of Example 2 and the variation in time to cure the neat resin panel was monitored. The results are shown in Table II.

TABLE II

| Resin | Amount of Titanate Used (parts wt) | Cure Time (hours) |
| --- | --- | --- |
| 1e | 3.5 | 4 |
| 1e | 6.25 | 3 |
| 1e | 9.0 | 2.5 |
| 1f | 4.5 | 3.5 |
| 1f | 6.66 | 2.5 |
| 1f | 9.0 | 2.25 |
| 1g | 5.0 | >15 |
| 1g | 7.24 | 6.5 |
| 1g | 10.0 | 6 |

EXAMPLE 4

The process of Example 2 was repeated employing compositions 1e, 1f, 1g and the Comparative Example but varying the cure time employed in order to determine the various mechanical and thermal properties thereof. The results are shown in Tables III and IV.

TABLE III

| Resin/Parts wt. | Cure Time (Hours) | Tg (onset) ° C. |
| --- | --- | --- |
| Comp.Ex 1/- | >18 hours | 127 |
| 1f/9 | 6 | 105 |
| 1g/6.66 | 6 | 139 |
| 1g/6.66 | 6 | 138 |
| 1e/9 | 6 | 133 |
| 1e/9 | 3 | 105 |

TABLE IV

| Resin/ parts wt. | Cure Time (Hours) | Yield Stress (MPa) | Modulus (GPa) | $K_c$ (MPam$^{-3/2}$) | $G_c$ (KJm$^{-2}$) | Ductility Factor (mm) |
| --- | --- | --- | --- | --- | --- | --- |
| Comp. Ex 1/- | >18 | 162 | 3.8 | 1.53 | 0.76 | 0.15 |
| 1f/9 | 6 | 158 | 3.7 | 1.89 | 1.12 | 0.24 |
| 1g/6.66 | 6 | 163 | 3.6 | 1.58 | 0.83 | 0.16 |
| 1g/6.66 | 6 | 166 | 3.3 | 1.52 | 0.8 | 0.14 |
| 1e/9 | 6 | 159 | 3.3 | 1.13 | 0.45 | 0.09 |
| 1e/9 | 3 | 158 | 3.9 | 0.96 | 0.38 | 0.06 |

From Table III it is apparent that the glass transition temperature could be influenced by appropriate selection of Component d) and of curing time. Advantageously the glass transition temperature (Tg) could be decoupled from the curing temperature with selection of suitable components d), the neat cured resin of compositions 1e and 1g showing a Tg of 133° C. and 139° C. respectively after curing for 6 hours at 125° C. of the composition comprising 9.0 and 6.66 parts of component d) respectively.

From Table IV it is apparent that variation in the cured resin mechanical properties of yield stress, modulus, $K_c$, $G_c$ and ductility were typical of the Component d) employed and showed little variation with the cure time variation, indicating that curing was substantially complete in the shorter period employed and that the property showed little or no deterioration when subjected to continued heat.

EXAMPLE 5

Figure 1:
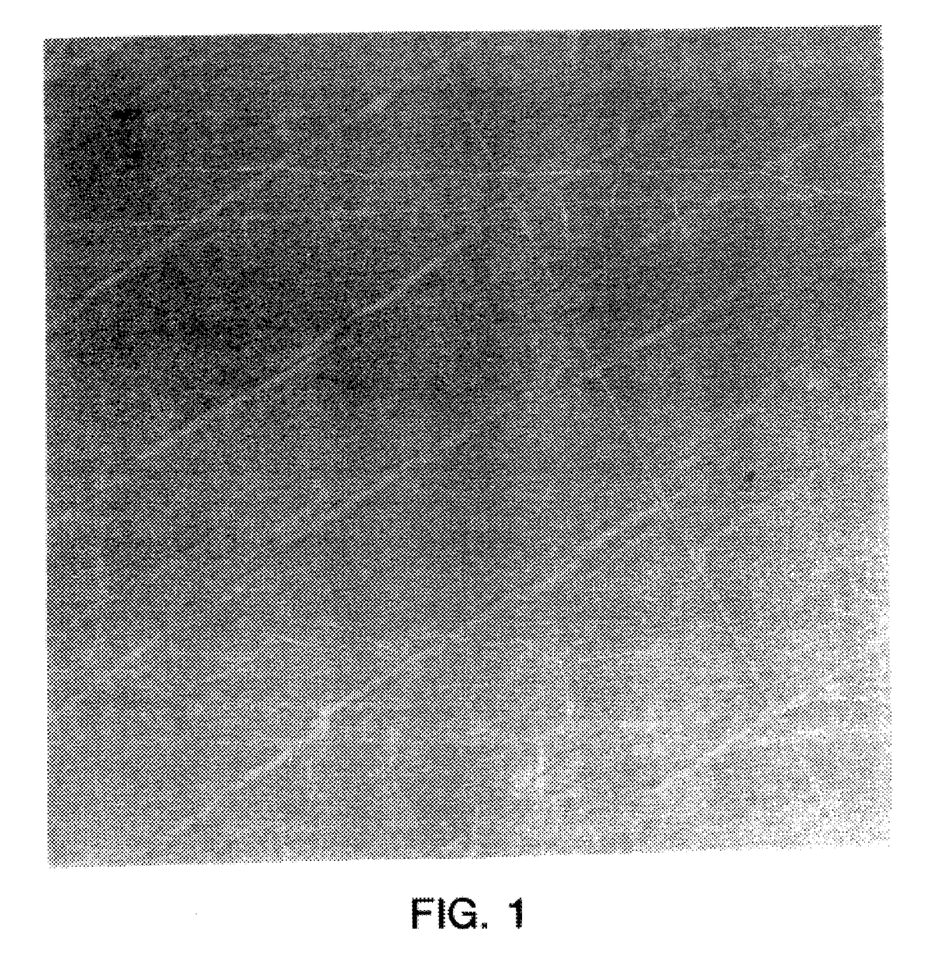
FIGS. 1 and 2 illustrate the morphology of an example of the present invention.
Figure 2:
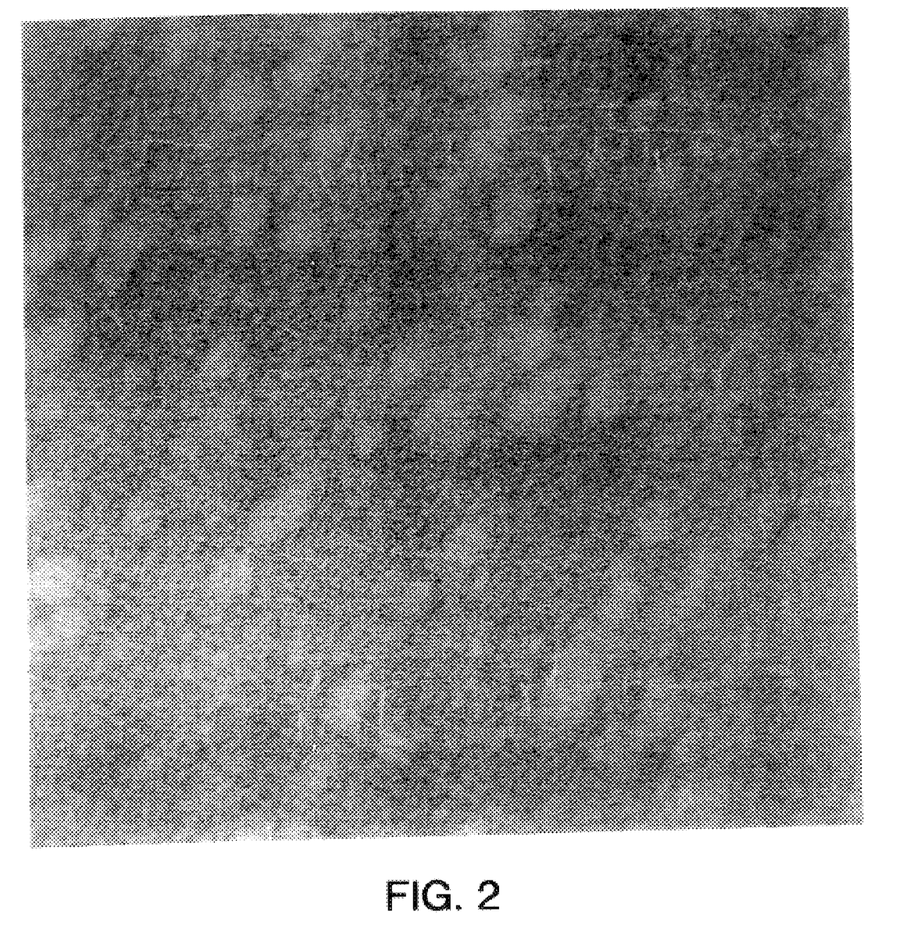

The morphology of the compositions was determined employing TEM by known manner. Morphologies were classed as co-continuous, phase inverted and combinations thereof with corresponding effect on the toughness of the cured resins. FIGS. 1 and 2 illustrate the morphology of comparative example 1 and of composition 1e according to the invention respectively. It will be apparent that the incorporation of Component d) has induced no change with respect to the co-continuous morphology of the resin of comparative example 1, however additional attractive features are induced by the microstructure included therein of the phase inverted type.

EXAMPLE 6

Preparation of a Prepreg of the Composition of the Invention

A solution containing epoxy formulation comprising 24.8 and 25.8 parts respectively of components MY0510 and PY306 and (on total solids) 30 parts of polyarylsulphone of 40:60 PES : PEES ratio, RV 0.26 and —$NH_2$ ends, in methylene chloride at 55% w/w solids content is made by melt-mixing the two epoxy resin precursors at 50–80° C., adding, with stirring, a solution of the polyarylsulphone in methylene chloride. It is heated at 80–120° C. to remove excess solvent and obtain a clear solution. 19.6 parts of the curing agent, DDS, is then added and stirred in until uniformly distributed, and 6.66 parts of titanate curing component, comprising an equivalent active weight of 5 parts, is then added. The resulting viscous liquid mixture is cooled and stored at 0° C. until required for use.

Unsized continuous collimated carbon fibres (available as grade AS4 Hercules Inc) are impregnated with this solution and the solvent evaporated to produce prepreg tape of resin content 36% w/w and less than 1% w/w volatiles. The prepreg is moulded in an autoclave into panels with appropriate lay-up using a standard vacuum bag technique and the following cure cycle:

heat to 125° C. at 2° C./min at a pressure held between 3 and 7 bar abs;

hold 6 h at 125° C. under pressure held between 3 and 7 bar abs whilst venting vacuum bag;

cool to room temperature at less than 3° C./min.

Cured composites were obtained according to the procedure of Example 6 with use of the following organotitanates as curing component of Example 6:

6e Tilcom TET (Triethanolamine titanate)

6g Tilcom TAA (Titanium acetylacetone)

6i Tilcom P12 (Titanium acetylacetone (non crystalline))

Comparative Example 2

The procedure of Example 6 was followed but with the omission of an organometallic Component d) as hereinbefore defined, to obtain a comparative cured composite not according to the invention.

EXAMPLE 7

The process of Example 6 was repeated employing the composites 6e and 6i but varying the amount of titanate used and cure time employed in order to determine various mechanical and thermal properties thereof.

Mechanical and thermal properties of unidirectional composites were determined. Composites were subject to curing using conditions of 125° C. for five hours (hereinafter cure 1) and test data obtained. Composites were further subject to a post-cure at 180° C. for two hours (hereinafter cure 2) and further test data obtained. The results are shown in Table V and VI.

TABLE V

| Composite/ | Modulus (GPa) | | TFS (MPa) | | SBS(MPa) |
|---|---|---|---|---|---|
| Parts wt. | Cure 1 | Cure 2 | Cure 1 | Cure 2 | Cure 1 |
| 6i/1 | 78.05 | 83.2 | 36.40 | 58.81 | 48.95 |
| 6i/3 | 80.3 | — | 39.96 | 58.63 | 69.27 |
| 6i/5 | 79.45 | 85.9 | 37.71 | 70.17 | 89.6 |
| 6e/3 | 77.4 | 83.3 | 32.1 | 80.57 | 40.56 |
| Comp. Ex2./- | 78.82 | 90.5 | 29.01 | 83.83 | 40.32 |

TABLE VI

| Composite./Parts wt. | Tg |
|---|---|
| 6i/1 | 90.73 |
| 6i/3 | 94.14 |
| 6i/5 | 111.7 |
| 6e/3 | 92.58 |
| Comp. Ex2/- | 76.48 |

TFS (Trans Flexural Strength) and SBS (Short Beam Shear) values indicate that both interfacial bonding and cohesive strength of the matrix resins are low. Values of between 40–50 MPa SBS suggest a weak interface bond (leading to inter laminar cracking) and low toughness matrix resins. This is attributed to the fact that the composites subject to cure 1 are incompletely cured. Notably the comparative example and composition 6e have low SBS values. As the amount of titanate in compositions 6i increases, so then does the value of SBS, suggesting an increase in inter laminar toughness in these systems.

The results therefore show that the compositions 6i have reached a gelation point after cure 1 much more rapidly than those of the corresponding Comparative Example 2.

The modulus values obtained from all the samples are similar.

With reference to modulus and TFS values after cure 2 it is clear that the modulus in all cases has increased suggesting that the cross-linked density has increased on post-curings. TFS values are also substantially higher in all cases, again suggesting that degree of cure and cross-linked density have greatly increased during post-cure. This increase in the degree of cure will improve both the cohesive strength of the matrix and the fibre matrix interfacial bond.

Accordingly it is apparent that the compositions of the invention are suited for first and second stage curing and post-curing in manner to provide cured systems having favourable mechanical properties. Notable is the intermediate properties obtained after cure 1 which infer that compositions of the invention have gelled sufficiently to be removed from the autoclave and subject to post-cure in standard atmospheric pressure curing apparatus. In contrast the compositions of the comparative examples are insufficiently gelled to enable removal from the autoclave without deterioration of the structure of the resin or composite.

With reference to Table VI the glass transition temperature (Tg) was determined by use of DMTA on composite systems cured at 125° C. for five hours. The compositions of the invention exhibit higher Tg than the uncatalysed Comparative Example 2. In general however the Tg results, with the possible exception of composition 6i/5, are low. This agrees with the previous data and suggests incomplete cure and a low degree of cross-linking in the epoxy network.

Moreover it would seem that variation in the post-cured resin mechanical properties of TFS were typical of the Component d) employed and showed little variation with the amount of component d), indicating that curing was substantially complete in the combined pre-cure and non-autoclave post-cure period. Post-cured properties of modulus showed little or no deterioration when compared to the comparative example cured under same conditions, indicating satisfactory suitability for commercial application.

It is therefore apparent that the glass transition temperature can be influenced by appropriate selection of nature and amount of Component d) and of curing time. Advantageously the glass transition temperature (Tg) can be decoupled from the curing temperature with selection of suitable components d), the neat cured resin 6i showing a variation in Tg of some 20° after curing for 5 hours at 125° C. of the composition comprising 1 to 5 parts (wt) of component d) respectively.

EXAMPLE 8

The morphology of the compositions of the previous examples was determined employing TEM by known manner. Morphologies were classed as co-continuous, phase inverted and combinations thereof with corresponding effect on the toughness of the cured resins. FIGS. 1 and 2 illustrate the morphology of Comparative Example 2 and of Composition 6e according to the invention respectively. SEM indicates that the incorporation of Component d) has induced no change with respect to the co-continuous morphology of the resin of composition 6i/1 when compared to the Comparative Example 2, however additional attractive mechanical features are induced by the microstructure included therein of the phase inverted type.

The morphologies of the 3 and 5 parts by weight systems of compositions 6i are all phase inverted with the thermoplastic rich phase being continuous. This seems to comprise a morphology of epoxy rich particles in a continuous thermoplastic rich phase. In these systems the continuous thermoplastic rich phase tends to dominate the mechanical properties of the matrix. This results in low modulus and a low cohesive strength of the matrix. Phase inverted morphologies also show poor environmental resistances to solvents.

It should be noted however that the advance in mechanical properties of the compositions when subject to cure 2 may therefore be influential in advancing and improving also their morphology. Accordingly it would seem that the ability to post-cure the compositions of the invention in a free standing oven at atmospheric pressure may be carried out without disrupting the development of morphology.

Accordingly, it will be apparent that the compositions according to the invention as hereinbefore defined and according to the Examples are eminently suited for casting in composite moulds having a heat resistance of greater than 180° C. over a period of up to five hours and/or of 125° C. over a prolonged period of up to 15 hours, for example for up to 5 hours. This represents a novel feature of the invention.

What is claimed is:

1. A curable composition comprising:
   (a) a thermoset resin component having reactive pendant and/or end groups;
   (b) a curing agent component;
   (c) an amount of a thermoplast component having reactive pendant and/or end groups; and
   (d) an organometallic curing catalyst component, wherein Component (d) is capable of forming cross-links with reactive pendant and/or end groups of the thermoset and thermoplast resins, and comprises an organometallic complex compound of the formula I:

$$M(R)_n \qquad (I)$$

wherein M is selected from titanium, zirconium, hafnium, cerium, vanadium, niobium, R is selected from mono-, bi- and tri and/or tetra dentate organic ligands and n is four or six, and wherein the composition is capable of being pre-cured to a gelled state, at elevated temperature up to 150° C. and post cured at elevated temperature up to 180° C., in a manner to advance mechanical properties to obtain higher Tg and improve morphology.

2. The curable composition according to claim 1, wherein Component (c) comprises at least one thermoplastic polyaryl sulphone component.

3. The curable composition according to claim 1, wherein Component (c) comprises at least one polyaryl sulphone comprising ether-linked repeating units, optionally additionally comprising thioether-linked repeating units, the units being selected from the group consisting of $$—(PhSO_2Ph)_n—$$

and optionally additionally $$—(Ph)_a—$$

wherein Ph is phenylene, n=1 to 2 and can be fractional, a=1 to 3 and can be fractional and when a exceeds 1, said phenylenes are linked linearly through a, single chemical bond or a divalent group other than —SO$_2$— or are fused together, provided that the repeating unit —(PhSO$_2$Ph)$_n$— is always present in said at least one polyarylsulphone in such a proportion that on average at least two of said units —(PhSO$_2$Ph)$_n$— are in sequence in each polymer chain present, said at least one polyarylsulphone having reactive pendant and/or end groups of formula —A'Y where A' is a divalent hydrocarbon group and Y is a group selected from groups providing active hydrogen, epoxy, cyanate, isocyanate, vinyl, allyl, ethynyl and maleimide functionality.

4. The curable composition according to claim 3, wherein the relative proportions of the said repeating units is such that on average at least two units (PhSO$_2$Ph)$_n$ are in immediate mutual succession in each polymer chain present and is in the range 1:99 to 99:1 respectively.

5. The curable composition according to claim 3, wherein the units are:

1 X Ph SO$_2$ Ph X Ph SO$_2$ Ph ("PES") and

11 X (Ph)a X Ph SO$_2$ Ph ("PEES")

where X is O or S and may differ from unit to unit; the ratio of 1 to 11 (respectively) between 10:90 and 80:20.

6. The curable composition according to claim 2, wherein the polyaryl sulphone contains up to 50% molar of other repeating units.

7. The curable composition according to claim 2, wherein the number average molecular weight of the polyaryl sulphone is in the range 2000 to 60000.

8. The curable composition according to claim 1, wherein Component (a) is selected from the group consisting of an epoxy resin, an addition-polymerization resin, a formaldehyde condensate resin, a cyanate resin, an isocyanate resin and mixtures of two or more thereof.

9. The curable composition according to claim 1, wherein Component (a) is an epoxy resin derived from a mono or poly-glycidyl derivative of one or more of the group of compounds consisting of aromatic diamines, aromatic monoprimary amines, aminophenols, polyhydric phenols, polyhydric alcohols, polycarboxylic acids, and mixtures thereof.

10. The curable composition according to claim 1, wherein Component (b) comprises an amino compound having a molecular weight up to 500 per amino group.

11. The curable composition according to claim 1, wherein M is selected from titanium and zirconium.

12. The curable composition according to claim 11, wherein Component (d) comprises at least in part, an amount of compound of formula I which has been pre-reacted to form multinuclear complex, oligomeric or combination products.

13. The composition as claimed in claim 1, wherein R is independently organic ligands comprising one or more nucleophilic units or moieties, selected from straight or branched, short or long chain alcohols, amines, acids, esters, phosphates, ketones and anhydrides which may optionally be additionally functionalized, and combinations thereof.

14. The curable composition according to claim 1, wherein R is a combination of monodentate ligands with one or more bi, tri or tetradentate ligands, and is selected from glycols, alkanolamines, alpha-hydroxy acids, -keto-esters and acid phosphates and combinations thereof.

15. The curable composition according to claim 14, wherein Component (d) comprises an organo titanate wherein two of the organic ligands comprise monodentate ligands and a further two comprise bidentate chelate ligands, wherein the ligands may be present in any combination of multiplicity and type.

16. The composition as claimed in claim 14, wherein the component (d) includes one or more organotitanates of the formula II:

Ti(R')₄      (II)

wherein R' is selected from organic ligands optionally in combination with one or more bidentate ligands selected from glycols, alcohol amines, alphahydroxy acids, -ketone esters and acid phosphates.

17. The curable composition according to claim 16, wherein the Component (d) comprises one or more monodentate ligands selected from alcohols and amines optionally in combination with one or more bidentate ligands selected from glycols, alcohol amines, alphahydroxy acids, -ketone esters and acid phosphates.

18. The curable composition according to claim 1, wherein said composition further comprises a fibre reinforcement.

19. The curable composition according to claim 1, said composition further comprising a toughening agent selected from liquid rubbers having reactive groups, aggregates, glass beads, rubber particles and rubber-coated glass beads, filler selected from polytetrafluorethylene, silica, graphite, boron nitride, mica, talc and vermiculite, pigments, nucleating agents, and stabilizers.

20. The curable composition according to claim 1, wherein said composition is cast in a mold to support the composition during the curing thereof, and wherein the mold is constructed of a thermoset material having heat resistance in excess of the curing temperature to be employed.

21. A Pre-preg comprising a curable composition comprising:

(a) a thermoset resin component having reactive pendant and/or end groups;

(b) a curing agent component;

(c) an amount of a thermoplast component having reactive pendant and/or end groups;

(d) an organometallic curing catalyst component; and (e) a continuous fibre reinforcement, wherein the Component (d) is capable of forming cross-links with reactive pendant and/or end groups of the thermoset and thermoplast resins, and comprises an organometallic complex compound of the formula I:

M(R)ₙ      (I)

wherein M is selected from titanium, zirconium, hafnium, cerium, vanadium, niobium, R is selected from mono-, bi- and tri and/or tetra dentate organic ligands and n is four or six, and wherein the composition is capable of being pre-cured to a gelled state, at elevated temperature up to 150° C. and post cured at elevated temperature up to 180° C., in a manner to advance mechanical properties to obtain higher Tg and improve morphology.

22. The pre-preg according to claim 21, wherein said pre-preg is cured.

23. The pre-preg according to claim 21, wherein said pre-preg is a shaped product.

24. A process for the preparation of a curable composition for a composite comprising:

(a) a thermoset resin component having reactive pendant and/or end groups;

(b) a curing agent component;

(c) an amount of a thermoplast component having reactive pendant and/or end groups; and (d) an organometallic curing catalyst component, wherein Component (d) is capable of forming cross-links with reactive pendant and/or end groups of the thermoset and thermoplast resins, and comprises an organometallic complex compound of the formula I:

M(R)ₙ      (I)

wherein M is selected from titanium, zirconium, hafnium, cerium, vanadium, niobium, R is selected from mono-, bi- and tri and/or tetra dentate organic ligands and n is four or six, and wherein the composition is capable of being pre-cured to a gelled state, at elevated temperature up to 150° C. and post cured at elevated temperature up to 180° C., in a manner to advance mechanical properties to obtain higher Tg and improve morphology, said process comprising the steps of:

(1) admixing the components (a), (b), (c) and any optionally additional materials; and (2) combining the result of step 1 with Component (d).

25. A process for the preparation of a curable composition for a composite comprising:

(a) a thermoset resin component having reactive pendant and/or end groups;

(b) a curing agent component;

(c) an amount of a thermoplast component having reactive pendant and/or end groups: and (d) an organometallic curing catalyst component, wherein Component (d) is capable of forming cross-links with reactive pendant and/or end groups of the thermoset and thermoplast resins, and comprises an organometallic complex compound of the formula I:

$$M(R)_n \qquad (I)$$

wherein M is selected from titanium, zirconium, hafnium, cerium, vanadium, niobium, R is selected from mono-, bi- and tri and/or tetra dentate organic ligands and n is four or six, said process comprising the steps of:
(1) subjecting said composition to a first elevated temperature up to 150° C. and elevated pressure to a gelled state; and
(2) post-curing at a second elevated temperature up to 180° C. and atmospheric pressure in a manner to advance mechanical properties of said composition to obtain higher Tg and improve morphology.

26. The process according to claim 25, wherein said composite is a shaped article, and wherein curing of said composite is carried out while in contact with or contained in a suitable support.

27. The process according to claim 26, wherein said support is able to maintain its molding integrity at temperatures not substantially exceeding 180° C.

28. The process according to claim 25, wherein said first elevated temperature is at an elevated temperature in the range of 100–130° C., and post-curing at a second elevated temperature is at temperatures in the range of 150–180° C.

* * * * *